Nov. 9, 1926.  1,606,283

R. WOLF ET AL

RADIO RECEIVING SYSTEM

Filed Sept. 22, 1922

INVENTORS
Rudolf Wolf
Adria A. Wadsworth Jr.
BY
Duell, Warfield & Duell
ATTORNEY Patented Nov. 9, 1926.

1,606,283

UNITED STATES PATENT OFFICE.

RUDOLF WOLF AND ADNA A. WADSWORTH, JR., OF NEW YORK, N. Y., ASSIGNORS, BY MESNE ASSIGNMENTS, TO HOLLAND S. DUELL AND KENNETH O'BRIEN, BOTH OF NEW YORK, N. Y.

RADIO RECEIVING SYSTEM.

Application filed September 22, 1922. Serial No. 589,749.

This invention relates to a radio-receiving system, and more particularly to systems adapted for the reception of continuous waves of radio disturbances, such as are employed in the art of wireless telephony, broadcasting, and the like.

This invention has for its object the provision of an improved construction and arrangement of parts for detecting and amplifying the effect of the received waves in the signal reproducing parts of the receiving apparatus.

Another object is to increase the loudness and definition of sounds which are received in telephone receivers used in conjunction with the detector sets of radio-receiving apparatus.

Another object is to increase the sensitiveness of the detector sets whereby a greater distance of transmission becomes possible, or the amount of energy required to be received at any particular place for the reproduction of signals of given strength is less.

Still another object is to provide an improved receiving element for use with detector sets, particularly those which have rectifying characteristics, adapted by its own intrinsic arrangement to impress upon such set potential oscillations whose amplitudes are materially increased or augmented over those normally applied by the receiving element.

Other objects will be in part pointed out in connection with the following detailed description and will be in part obvious as the description proceeds.

The invention accordingly consists in the features of construction, combinations of elements and arrangement of parts which will be exemplified in the construction hereinafter set forth, and the scope of their application will appear in the appended claims.

Figure 1:
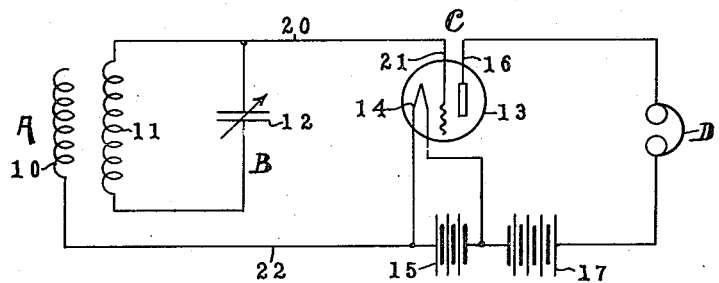
Figure 2:
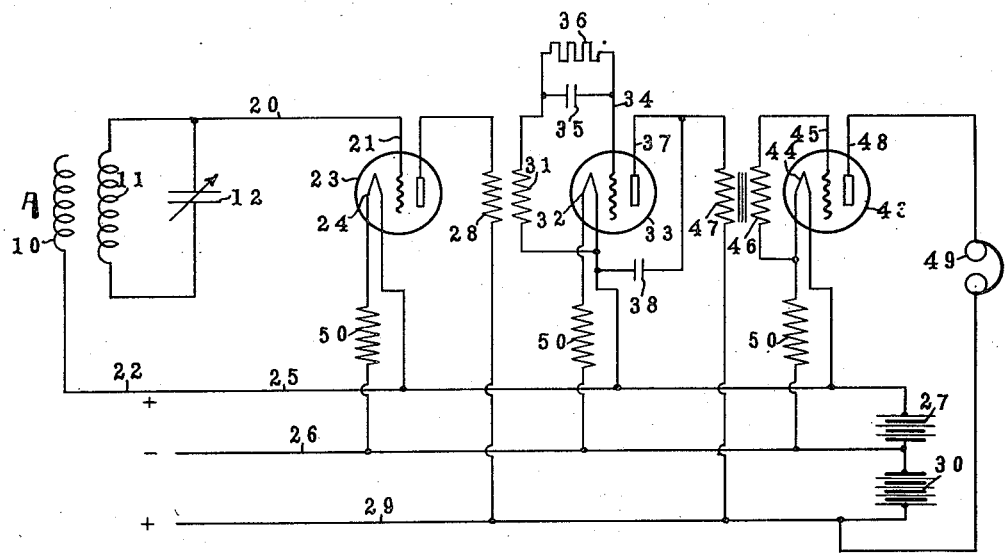
Figure 3:
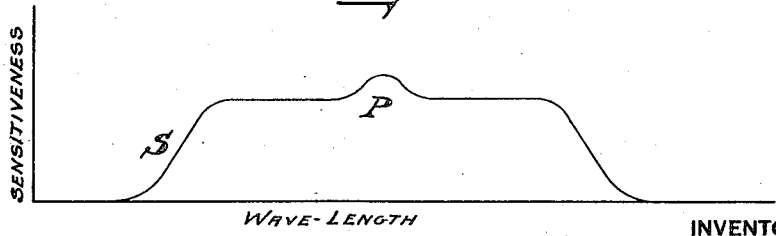

For a more complete understanding of the nature and advantages of this invention reference should be had to the following detailed description which describes the best illustrative embodiments of this invention at present known to us taken in connection with the accompanying drawing in which, Fig. 1 shows diagrammatically a wiring system adapted for the reception of radio disturbances constructed in accordance with this invention;

Fig. 2 shows a modified arrangement of wiring adapted for carrying out the principle of this invention; and Fig. 3 is an explanatory diagram.

Referring now to the drawing, and particularly to Fig. 1, in the broad aspect of this invention here illustrated, it comprises an element A, adapted to receive the exciting radio-disturbance, such element having a conducting portion B adapted to be traversed with oscillating current. The nature of this disturbance is detected and made intelligible or audible in a detector set shown at C, which is here illustrated as having telephones at D for translating into audible signals the radio-disturbance received.

The receiving element A comprises an inductive winding 10, which is adapted to be disposed in a plane, preferably a vertical plane for picking up the ordinary radio-disturbance, such plane being adapted to be placed normal to the wave front of the incoming radio-disturbance that is being picked up. The winding 10, thus arranged, serves as a loop antenna, and has disposed physically parallel thereto a second winding 11, which serves in the dual capacity of being both a counterpoise to the loop antenna 10, and of being the secondary of an oscillating transformer. The winding 11 has connecting across its terminals the variable capacity 12 which completes an oscillating circuit adapted to be traversed by oscillating current induced by the disturbance picked up by the loop antenna 10.

The detector set, indicated at C, here comprises a three-electrode type of electron discharge tube 13, serving as the detector, which has its filament 14 connected across a constant source of E. M. F. at 15, commonly referred to as the "A battery". From the plate electrode 16 of this tube a circuit is completed which includes the telephones D and a second constant source of E. M. F. 17, commonly referred to as the "B battery". This circuit is completed through a connection preferably with the negative side of the filament circuit.

The oscillating circuit is connected to the detector set solely through the conductor 20 which leads from a point on the winding 11

(specifically a terminal of the winding) to the grid electrode 21 of the detector tube 13. The other side of the oscillating circuit is unconnected so that its potential is left free to float. Similarly one end of the winding 10 is left free and unconnected. This free end of winding 10 corresponds to the end of winding 11 which is connected to the grid electrode 21. The other end of winding 10 is connected to a filament terminal of the tube 13 by the conductor shown at 22, such connection being preferably made through the positive side.

In operation, the effect of employing a floating oscillating circuit connected to the detector set by the sole connection here indicated is to impress potential oscillations upon the grid which are materially augmented or increased in amplitude so that there are unilateral discharges through the plate circuit, of correspondingly increased strength. Audible signals of increased strength are accordingly produced in the telephones at D. The extent to which the oscillating potential of the disturbance being detected has been increased or augmented can be readily ascertained by connecting the other side of the oscillating circuit to the filament electrode of the tube 13 in the usual manner. When so connected only the ordinary faint or weak sound is discernable in the telephone indicating that the potential variations impressed upon the grid are relatively small with correspondingly small discharges passing in the plate circuit.

The free or unconnected end of the winding 10 may also be said to float since its potential with respect to the winding 11 is not fixed. The connection at 22 of course causes the potential of one end of winding 10, whatever it may be, to be impressed upon the filament electrode of tube 13. The detector set is thus seen to have connected across it two members which are traversed by oscillations whose relative potentials are floating. It will be observed, however, that while what is here shown in the drawing at the upper end of winding 11 is connected to one side of the detector set, the corresponding end of the winding 10 is unconnected. Similarly the end of winding 11 (lower end in drawing) which corresponds to the end of winding 10 which is connected to the other side of the detector set, is unconnected. These floating windings or members of the receiving element thus are connected to the detecting set at ends which are at opposite potentials and may accordingly be said to be disposed in potential apposition. The augmented potential oscillations impressed on the detector set C, and specifically upon the grid electrode 21 by the receiving element A are apparently thus due to the fact that these floating potentials of these oscillating members build up electrostatically until substantially the potential difference which would result from the two windings 10 and 11 being in series is impressed across the detector set thereby releasing unilateral discharges in the plate circuit of correspondingly increased magnitude and increasing in consequence the effect of the grid variations in the plate circuit.

This growth of potential in the windings 10 and 11 as will be perceived is further increased by the mutual inductive action of the two windings. When the capacity or condenser at 12 is tuned to be resonant with the inductance at 11 to the frequency of the incoming radio-disturbance being picked up, the maximum current is of course flowing in the oscillating circuit; this current induces a corresponding growth of current in the winding 10. As a result, when the oscillating circuit is tuned to resonance the maximum potential variations will be impressed upon the grid of the detector set. It is thus perceived that the mutual induction effect and the distance apart of the windings 10 and 11 are material factors in the construction and arrangement of parts in accordance with the principles of this invention. We have found that in practice good results are to be obtained by making the winding 10 of five or six concentric turns, the turns being spaced apart about a quarter of an inch from each other, and may be from two to four feet in diameter. Winding 11 is similarly made but has preferably a few more turns, as seven or eight.

The use of a pair of floating oscillating members disposed in potential apposition is not in all instances necessary to the practice of this invention, the use of one member preferably shunted by a condenser to form an oscillating circuit being under proper conditions sufficient to obtain the results of this invention. The modification in which but one member is thus employed though claimed broadly here is claimed specifically in our co-pending application Serial No. 607,281, filed December 16, 1922.

The theory of operation here outlined may or may not prove to be ultimately correct. We however do not desire to be confined to this theory of operation, nor do we put it forward as the necessarily correct theory, but have put it forward merely as a means for making the principle of the invention more readily understood.

The practice of the invention, furthermore, is not limited to the type of detector set shown in Fig. 1. It is, however, advantageous to use the receiving element in conjunction with a detector set in which amplification and detection of the initial disturbance is accomplished, it being preferable to have the amplification produced in more than one stage. For this purpose, a cascade arrangement of electron discharge tubes which are adapted for successive amplification and detection of the radio disturbance may with advantage be employed, such an arrangement being shown in Fig. 2. In Fig. 2, the receiving element A is shown as composed of the floating oscillating members 10 and 11, the member 11 being conducted by conductor 20 to the grid electrode 21 of the first electron discharge tube 23, the other member being connected by conductor 22 to a filament terminal of the filament 24. This filament 24 is supplied with heating energy from the busses at 25 and 26. These busses are connected across a constant source of E. M. F. as from the "A battery" shown at 27. The plate circuit of the tube 23 is connected through the primary 28 of a radio-frequency transformer, the connection leading to the positive buss 29, which leads to a pole of the "B battery" shown at 30. The other side of this "B battery" is connected with the buss 26 to complete the plate circuit. The radio-frequency transformer has a secondary 31, which is connected in the grid circuit of a second electron discharge tube 33. This tube has a filament 32 connected across the busses at 25 and 26, one terminal of which leads to one end of the secondary 31. The other end of this secondary is connected to the grid electrode 34, preferably through the grid leak comprising capacity, as shown at 35, shunted by a pure resistance of suitable value, as shown at 36. The plate circuit leading from the plate electrode 37 is also shunted by means of a capacity connected in parallel therewith, shown at 38. This is adapted to by-pass any radio-frequencies which may have passed to the plate circuit. The plate circuit thus shunted is assumed to transmit only audio-frequencies, which are further amplified and passed to the electron discharge tube 43. This latter tube has a filament 44, and a grid 45. Across the grid and filament of this tube is connected the secondary 46 of the audio-frequency transformer, whose primary 47 is connected to the plate electrode 37 of the tube 33, the other side being connected to the buss 29 in the usual manner. The tube 43 has a plate electrode 48, which also has a conducting connection leading to the buss 29, and includes the telephones 49. Ballast resistance may be connected in the filament circuit of each of the tubes, as indicated at 50, in the respective filament circuits.

The precision and distinctness of the signal reproduced in the telephones 49 may be further increased by so designing the cascade set here described to be selectively responsive to frequencies over a limited range. This can be accomplished by a suitable design of the radio transformer with respect to the discharge tube by evolving the proper proportioning of its resistance and inductance to the capacity of the tube. The various tubes and transformers in the set may be designed so that their respective frequency ranges will somewhat overlap, producing what is styled a "band" of frequencies to which they are responsive. This effect may be further enhanced by increasing still more the sensitivity to the frequency of the particular wave length which it is desired to receive. This characteristic is illustrated in Fig. 3.

Here wave-lengths are denoted as abscissæ. The ordinates represent degrees of sensitiveness on any convenient scale; a measure of the sensitivity in such cases being the amount of current flowing in the plate circuit for the wave length in question. The curve at "S" in Fig. 3 is typical of the range of sensitiveness of the band in such a detector set. Where this is made particularly sensitive to a particular wave-length, this curve would have a crest, as indicated at "P." This characteristic is particularly desirable where it is desired to design a detector set to pick up the radio-disturbances sent out from some particular broadcasting station, such for instance as the wave-length of 360 metres, at present used in certain of the large stations.

In operation this modified form of the invention functions in a manner similar in substantially all respects to that in which the apparatus in Fig. 1, described above, functions.

The floating oscillating members 10 and 11 receive the incoming radio-disturbance which induces oscillating current within the oscillating circuit containing both the condenser 12 as well as the inductance member 11. When tuned to be resonant to the incoming frequency, the maximum oscillating current, of course, flows. By reason of their mutual inductive action the growth of current in the members 10 and 11 causes the original potentials further to build up which by reason of their floating character impress potential oscillations of augmented amplitude across the first tube 23 of the detector set.

This tube and its connections are preferably so arranged as to pass a unilateral discharge through the plate circuit including the primary 28 of the radio-transformer which discharge has a relatively high frequency, generally termed a "radio-frequency." This discharge through the radio-transformer is impressed upon the tube 33 whose connections are proportioned to filter out, as it were, the potential variations from the radio-frequency discharge first set up. These variations which are of course slower than the "radio-frequencies" are said to have an "audio-frequency." In the arrangement shown, the audio-frequency current passed by tube 33 is again amplified before passed to the telephone 49 by means of the tube 43. The set, when limited to respond to a desired band of frequencies, is adapted to the reproduction of signals with great loudness and precision when used with a receiving element having oscillating members arranged as here disclosed.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described, and all statements of the scope of the invention which, as a matter of language, might be said to fall therebetween.

Having described our invention, what we claim as new and desire to secure by Letters Patent is:

1. In a radio receiving system, the combination with a receiving element comprising a loop antenna and a counterpoise disposed physically parallel therewith and having a condenser connected across its terminals to complete an oscillating circuit, of a detector set having an electron discharge tube; said oscillating circuit being connected to said tube solely through a connection leading to the grid terminal of said discharge tube, the loop aerial being connected solely through a conductor leading from one end to a filament terminal.

2. In a radio receiving system, the combination with a receiving element comprising a loop antenna and a counterpoise disposed in inductive or capacitative relation therewith, of a detector set having a three-electrode electron discharge tube; one end of said counterpose being connected to the grid of said tube the other end being free, and the end of said antenna corresponding to the free end of said counterpose being connected to a filament terminal of said tube, the other end being free.

3. In a radio receiving system, the combination with a receiving element comprising a loop antenna and a counterpoise disposed in inductive or capacitative relation therewith, said counterpoise having a variable capacity connected across its terminals, of a detector set having a three-electrode electron discharge tube; one end of said counterpoise being connected to the grid of said tube the other end being free, and the end of said antenna corresponding to the free end of said counterpoise being connected to a filament terminal of said tube, the other end being free.

In testimony whereof we affix our signatures.

RUDOLF WOLF.
ADNA A. WADSWORTH, Jr.